United States Patent
Huang et al.

(10) Patent No.: US 9,110,339 B2
(45) Date of Patent: Aug. 18, 2015

(54) PIXEL STRUCTURE, VERTICAL ALIGNMENT MODE LIQUID CRYSTAL DISPLAY DEVICE AND PIXEL DRIVING METHOD OF LIQUID CRYSTAL DISPLAY DEVICE

(75) Inventors: Yu-Sheng Huang, Hsin-Chu (TW); Ya-Ling Hsu, Hsin-Chu (TW); Hung-Lung Hou, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 933 days.

(21) Appl. No.: 13/173,934

(22) Filed: Jun. 30, 2011

(65) Prior Publication Data

US 2012/0069256 A1    Mar. 22, 2012

(30) Foreign Application Priority Data

Sep. 17, 2010 (TW) ............................... 99131685 A

(51) Int. Cl.
  *G02F 1/133* (2006.01)
  *G02F 1/1343* (2006.01)
  *G02F 1/1362* (2006.01)
  *G02F 1/139* (2006.01)

(52) U.S. Cl.
  CPC ........ *G02F 1/134309* (2013.01); *G02F 1/1393* (2013.01); *G02F 1/13624* (2013.01); *G02F 2001/134381* (2013.01); *G02F 2201/124* (2013.01)

(58) Field of Classification Search
  None
  See application file for complete search history.

(56) References Cited

U.S. PATENT DOCUMENTS

| 6,407,793 | B1 | 6/2002 | Liang et al. |
| 6,433,764 | B1 | 8/2002 | Hebiguchi et al. |
| 6,542,212 | B2 | 4/2003 | Yoshida et al. |
| 8,194,215 | B2 * | 6/2012 | Smith et al. ................... 349/134 |
| 2010/0103085 | A1 | 4/2010 | Lee et al. |

FOREIGN PATENT DOCUMENTS

| CN | 101726893 A | 6/2010 |
| CN | 101916014 | 12/2010 |

OTHER PUBLICATIONS

U.S. Appl. No. 13/008,028, filed Jan. 18, 2011.

* cited by examiner

*Primary Examiner* — Sarah Hahm
(74) *Attorney, Agent, or Firm* — WPAT, PC; Justin King

(57) ABSTRACT

A pixel structure adapted to a vertical alignment (VA) mode liquid crystal display (LCD) device is provided. The pixel structure includes a plurality of comb-shaped electrodes and a plurality of pixel transistors. The comb-shaped electrodes are interdigitated in a pairwise manner and thereby constitute at least one comb-shaped electrode pair. The pixel transistors respectively are electrically coupled to the comb-shaped electrodes. The comb-shaped electrodes respectively are electrically coupled to receive a plurality of data voltages through the respective pixel transistors and whereby at least a part of the data voltages are different, and the data voltages received by the two comb-shaped electrodes of each comb-shaped electrode pair are different from each other. Moreover, a VA mode LCD device using the pixel structure and a pixel driving method adapted thereto are also provided.

14 Claims, 3 Drawing Sheets

PIXEL STRUCTURE, VERTICAL ALIGNMENT MODE LIQUID CRYSTAL DISPLAY DEVICE AND PIXEL DRIVING METHOD OF LIQUID CRYSTAL DISPLAY DEVICE

BACKGROUND

1. Technical Field

The description generally relates to liquid crystal display fields and, particularly to a pixel structure, a vertical alignment mode liquid crystal display device and a pixel driving method of liquid crystal display device.

2. Description of the Related Art

Nowadays, liquid crystal display devices have many advantages of high display quality, small volume, light weight and wide application range and thus are widely used in consumer electronics products such as mobile phones, laptop computers, desktop computers and televisions, etc. Moreover, the liquid crystal display devices have evolved into a mainstream display in place of cathode ray tube (CRT) displays.

In recent years, liquid crystal display screens of laptop computers with privacy function could potentially meet the demands for business people. Although the prevailing 3M privacy filter in the market can achieve a good privacy effect, the display brightness is decreased and it is inconvenient in use resulting from the privacy filter is necessarily removed before sharing the screen to multiple persons. In addition, an adjustable privacy screen such as a view angle controllable screen introduced by some company can be freely switched between a wide view mode and a narrow view mode. However, since such view angle controllable screen is designed with an additional view angle adjustable sub-pixel in each pixel, the additional sub-pixel is useless (i.e., not turned on) when the screen operates in the wide view mode, so that the brightness of the liquid crystal display panel is decreased.

SUMMARY

A pixel structure in accordance with an embodiment of the present invention is adapted to a vertical alignment (VA) mode liquid crystal display (LCD) device. In the present embodiment, the pixel structure includes a plurality of comb-shaped electrodes and a plurality of pixel transistors. The comb-shaped electrodes are interdigitated in a pairwise manner to form at least one comb-shaped electrode pair. The pixel transistors are respectively electrically coupled to the comb-shaped electrodes. The comb-shaped electrodes are electrically coupled to receive a plurality of data voltages through the respective pixel transistors. At least a part of the data voltages are different, and the data voltages received by the two comb-shaped electrodes in each comb-shaped electrode pair are different from each other.

In one embodiment, the two comb-shaped electrodes in each comb-shaped electrode pair receive the different data voltages from a same data line of the VA mode LCD device through two corresponding ones of the pixel transistors. In another embodiment, the two comb-shaped electrodes in each comb-shaped electrode pair receive the different data voltages respectively from two data lines of the VA mode LCD device through two corresponding ones of the pixel transistors.

In one embodiment, the two pixel transistors electrically coupled to a same comb-shaped electrode pair are sequentially enabled respectively by gate driving signals provided from two gate lines of the VA mode LCD device. In another embodiment, the two pixel transistors electrically coupled to a same comb-shaped electrode pair are enabled by a gate driving signal provided from a same gate line of the VA mode LCD device.

In one embodiment, the amount of the comb-shaped electrodes is four, the four comb-shaped electrodes are interdigitated in a pairwise manner to form two comb-shaped electrode pairs. The data voltages received by the four comb-shaped electrodes are partially identical.

A vertical alignment mode liquid crystal display device in accordance with an embodiment of the present invention includes a first data line, two gate lines and a pixel structure. The two gate lines are arranged crossing with the first data line. The pixel structure includes a plurality of pixel transistors and a plurality of comb-shaped electrodes. The comb-shaped electrodes are interdigitated in a pairwise manner and electrically coupled to the two gate lines through the respective pixel transistors. At least a part of the comb-shaped electrodes each is electrically coupled to the first data line through a corresponding one of the pixel transistors.

In one embodiment, the vertical alignment mode liquid crystal display device further includes a second data line. At least a part of the comb-shaped electrode(s) uncoupled to the first data line each is electrically coupled to the second data line through a corresponding one of the pixel transistor. Moreover, the amount of the comb-shaped electrodes can be four, the four comb-shaped electrodes are interdigitated in a pairwise manner to form two comb-shaped electrode pairs, and the two comb-shaped electrode pairs are arranged between the first data line and the second data line. In another embodiment, the first data line and the second data line are arranged between the two comb-shaped electrode pairs. In still another embodiment, the first and second data lines are alternately arranged with the two comb-shaped electrode pairs along a lengthwise direction of the two gate lines.

In one embodiment, the comb-shaped electrodes are interdigitated in a pairwise manner to form at least one comb-shaped electrode pair, the two comb-shaped electrodes in each comb-shaped electrode pair are respectively electrically coupled to the two gate line through two corresponding ones of the pixel transistors. In another embodiment, the two comb-shaped electrodes in each comb-shaped electrode pair are electrically coupled to a same one of the two gate line through two corresponding ones of the pixel transistors.

A pixel driving method of liquid crystal display device in accordance with an embodiment of the present invention is adapted to a vertical alignment mode liquid crystal display device. Herein, the vertical alignment mode liquid crystal display device includes a pixel structure and two gate lines. The pixel structure includes a plurality of comb-shaped electrodes and a plurality of liquid crystal molecules. The comb-shaped electrodes are electrically coupled to the two gate lines and interdigitated in a pairwise manner to form a plurality of comb-shaped electrode pairs. The two comb-shaped electrodes in each comb-shaped electrode pair are electrically coupled to the two gate lines respectively or electrically coupled to a same one of the two gate lines. In the present embodiment, the pixel driving method includes steps of: sequentially enabling the two gate lines; and providing a plurality of data voltages respectively to the comb-shaped electrodes to modulate an orientation of each of the liquid crystal molecules in the pixel structure, the data voltages being not completely identical. Moreover, the two data voltages received by the two comb-shaped electrodes in each comb-shaped electrode pair are different from each other.

In one embodiment, the pixel driving method further includes a step of: enabling the liquid crystal molecules in the pixel structure to align along a same orientation by the comb-shaped electrodes receiving the data voltages.

In one embodiment, the pixel driving method further includes a step of: enabling the liquid crystal molecules in the pixel structure to align along multiple different orientations by the comb-shaped electrodes receiving the data voltages.

In the various embodiments of the present invention, owing to the structural design of pixel electrode, cooperative with the liquid crystal molecule orientation control in the pixel structure by providing different data voltages (i.e., generally driving voltages), the pixel structure can achieve the purpose of view angle being adjustable e.g., switchable between a wide view mode and a narrow view mode and further the brightness of the display panel endowed with privacy function would not be decreased in the wide view mode.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the descriptions will be regarded as illustrative in nature and not as restrictive.

Figure 1:
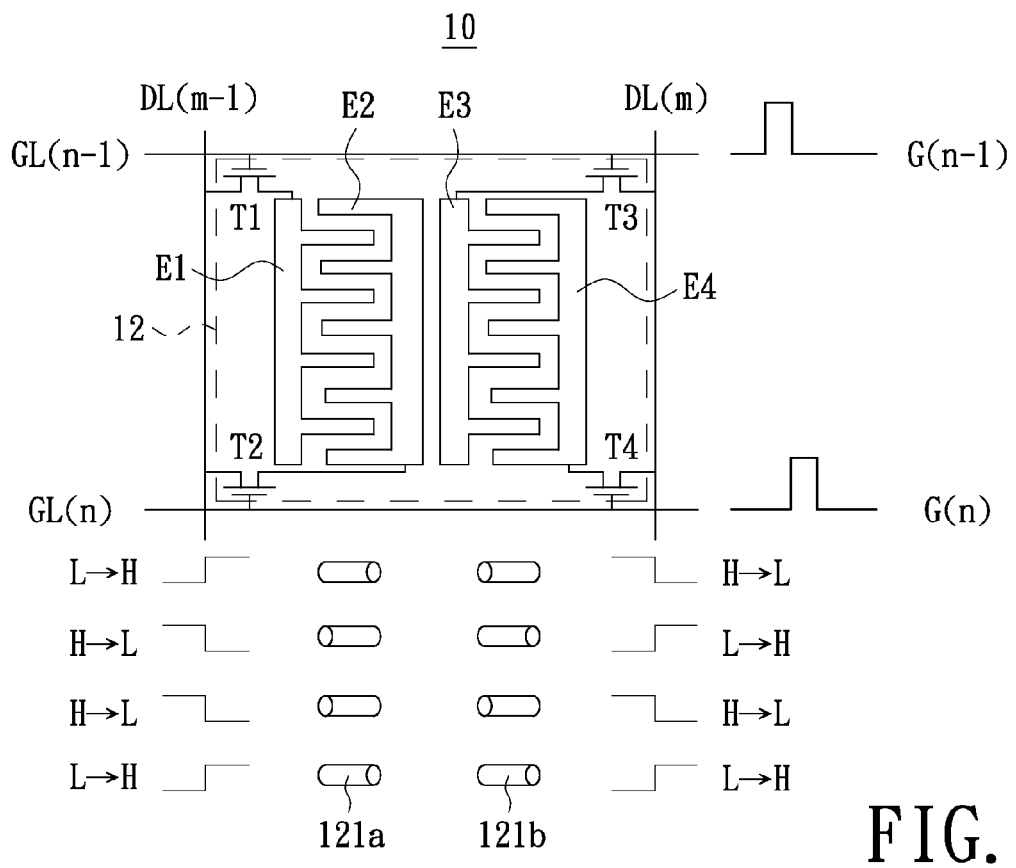
FIG. 1 is a partial schematic structural view of a vertical alignment mode liquid crystal display device in accordance with a first embodiment of the present invention.

FIG. 1 is a partial schematic structural view of a vertical alignment mode liquid crystal display device in accordance with a first embodiment. In FIG. 1, only one pixel structure of the vertical alignment mode liquid crystal display device 10 is shown for the purpose of illustration, but not to limit the amount of pixel structures of the vertical alignment mode liquid crystal display device in accordance with the present invention. As illustrated in FIG. 1, the pixel structure 12 includes comb-shaped electrodes E1, E2, E3, E4 and pixel transistors T1, T2, T3, T4. Herein, the comb-shaped electrodes E1, E2, E3, E4 cooperatively form a pixel electrode of the pixel structure 12. Of course, the pixel structure 12 generally further includes a common electrode (not shown in FIG. 1) disposed opposite to the pixel electrode and liquid crystal molecules such as 121a, 121b arranged between the pixel electrode and the common electrodes. In this embodiment, the comb-shaped electrodes E1, E2, E3 and E4 are interdigitated in a pairwise manner. Electrode fingers of the comb-shaped electrode E1 extend to the right side, electrode fingers of the comb-shaped electrode E2 extend to the left side, and thereby the comb-shaped electrodes E1 and E2 form a comb-shaped electrode pair. Likewise, electrode fingers of the comb-shaped electrode E3 extend to the right side, electrode fingers of the comb-shaped electrode E4 extend to the left side, and thereby the comb-shaped electrodes E3 and E4 form another comb-shaped electrode pair. The liquid crystal molecule 121a is arranged between the common electrode and the comb-shaped electrode pair E1, E2, and the liquid crystal molecule 121b is arranged between the common electrode and the comb-shaped electrode pair E3, E4. It is noted that, FIG. 1 shows one liquid crystal molecule is arranged the common electrode and each comb-shaped electrode pair for the purpose of illustration, and thus is not to limit the amount of liquid crystal molecule in the pixel structure 12 in accordance with the present invention.

The comb-shaped electrode E1 is electrically coupled to a data line DL(m−1) and a gate line GL(n−1) of the vertical alignment mode liquid crystal display device 10 through the pixel transistor T1, the comb-shaped electrode E2 is electrically coupled to the data line DL(m−1) and another gate line GL(n) of the vertical alignment mode liquid crystal display device 10 through the pixel transistor T2, the comb-shaped electrode E3 is electrically coupled to another data line DL(m) and the gate line GL(n−1) of the vertical alignment mode liquid crystal display device 10 through the pixel transistor T3, and the comb-shaped electrode E4 is electrically coupled to the data line DL(m) and the gate line GL(n) through the pixel transistor T4, where m and n both are integers. In short, the two comb-shaped electrodes such as E1 and E3 (or E3 and E4) in a same comb-shaped electrode pair are electrically coupled to a same data line such as DL(m−1) (or DL(m)) and respectively electrically coupled to the two gate lines GL(n−1) and GL(n).

During the pixel structure 12 displays a gray level, the gate lines GL(n−1) and GL(n) will sequentially provide gate driving pulses G(n−1) and G(n) to enable the pixel transistors T1, T2, T3 and T4, so that the comb-shaped electrodes E1, E2, E3, E4 are allowed to receive data voltages from the data lines DL(m−1) and DL(m). FIG. 1 shows four different situations (1)~(4) of the data voltages received by the comb-shaped electrodes E1, E2, E3 and E4 during sequentially providing the gate driving pulses G(n−1) and G(n).

(1) when the data voltage on the data line DL(m−1) is switched from a low voltage L to a high voltage H and the data voltage on the data line DL(m) is switched from the high voltage H to the low voltage L, i.e., the data voltage received by the comb-shaped electrode E1 is the low voltage L, the data voltage received by the comb-shaped electrode E2 is the high voltage H, the data voltage received by the comb-shaped voltage E3 is the high voltage H, and the data voltage received by the comb-shaped electrode E4 is the low voltage L, the liquid crystal molecule 121a controlled by the comb-shaped electrode pair E1, E2 tends to tilt to the right side, the liquid crystal molecule 121b controlled by the comb-shaped electrode pair E3, E4 tends to tilt to the left side, and therefore the pixel structure 12 operates at a wide view mode.

(2) when the data voltage on the data line DL(m−1) is switched from the high voltage H to the low voltage L, and the data voltage on the data line DL(m) is switched from the low voltage L to the high voltage H, i.e., the data voltage received by the comb-shaped electrode E1 is the high voltage H, the data voltage received by the comb-shaped electrode E2 is the low voltage L, the data voltage received by the comb-shaped electrode E3 is the low voltage L, and the data voltage received by the comb-shaped electrode E4 is the high voltage H, the liquid crystal molecule 121a controlled by the comb-shaped electrode pair E1, E2 tends to tilt to the left side, the liquid crystal molecule 121b controlled by the comb-shaped electrode pair E3, E4 tends to tilt to the right side, and therefore the pixel structure 12 operates at another wide view mode.

(3) when the data voltage on the data line DL(m−1) is switched from the high voltage H to the low voltage L, and the data voltage on the data line DL(m) also is switched from the high voltage H to the low voltage L, the liquid crystal molecule 121a controlled by the comb-shaped electrode pair E1, E2 tends to tilt to the left side, the liquid crystal molecule 121b controlled by the comb-shaped electrode pair E3, E4 also tends to tilt to the left side, and therefore the pixel structure 12 operates at a narrow view mode (i.e., an anti-peek mode) and only is suitable for the user to observe from the right side.

(4) when the data voltage on the data line DL(m−1) is switched from the low voltage L to the high voltage H, and the data voltage on the data line DL(m) also is switched from the low voltage L to the high voltage H, the liquid crystal molecule 121a controlled by the comb-shaped electrode pair E1, E2 tends to tilt to the right side, the liquid crystal molecule 121b controlled by the comb-shaped electrode pair E3, E4 also tends to tile to the right side, and therefore the pixel structure 12 operates at another narrow view mode (i.e., another anti-peek mode) and only is suitable for the user to observe from the left side.

Figure 2:
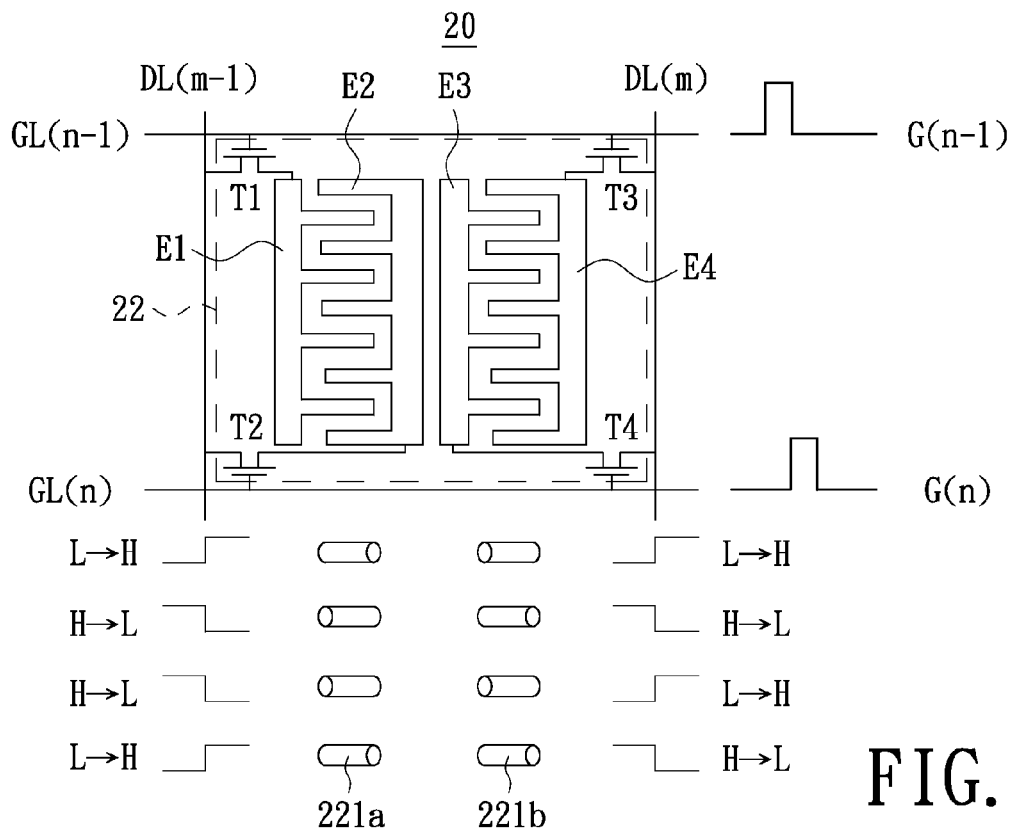
FIG. 2 is a partial schematic structural view of a vertical alignment mode liquid crystal display device in accordance with a second embodiment of the present invention.

Referring to FIG. 2, a partial schematic structural view of a vertical alignment mode liquid crystal display device in accordance with a second embodiment of the present invention is shown. In FIG. 2, only one pixel structure of the vertical alignment mode liquid crystal display device 20 is shown for the purpose of illustration, but not to limit the amount of pixel structures of the vertical alignment mode liquid crystal display device in accordance with the present invention. As illustrated in FIG. 2, the pixel structure 22 includes comb-shaped electrodes E1, E2, E3, E4 and pixel transistors T1, T2, T3, T4. Herein, the comb-shaped electrodes E1, E2, E3, E4 cooperatively form a pixel electrode of the pixel structure 22. Of course, the pixel structure 22 generally further includes a common electrode (not shown in FIG. 2) disposed opposite to the pixel electrode and liquid crystal molecules such as 221a, 221b arranged between the pixel electrode and the common electrodes. In this embodiment, the comb-shaped electrodes E1, E2, E3 and E4 are interdigitated in a pairwise manner, and thereby the comb-shaped electrodes E1 and E2 form a comb-shaped electrode pair, and likewise the comb-shaped electrodes E3 and E4 form another comb-shaped electrode pair. The liquid crystal molecule 221a is arranged between the common electrode and the comb-shaped electrode pair E1, E2, and the liquid crystal molecule 221b is arranged between the common electrode and the comb-shaped electrode pair E3, E4.

The comb-shaped electrode E1 is electrically coupled to a data line DL(m−1) and a gate line GL(n−1) of the vertical alignment mode liquid crystal display device 20 through the pixel transistor T1, the comb-shaped electrode E2 is electrically coupled to the data line DL(m−1) and another gate line GL(n) of the vertical alignment mode liquid crystal display device 20 through the pixel transistor T2, the comb-shaped electrode E3 is electrically coupled to another data line DL(m) and the gate line GL(n) of the vertical alignment mode liquid crystal display device 20 through the pixel transistor T4, and the comb-shaped electrode E4 is electrically coupled to the data line DL(m) and the gate line GL(n−1) through the pixel transistor T3, where m and n both are integers. In short, the two comb-shaped electrodes such as E1 and E2 (or E3 and E4) in a same comb-shaped electrode pair are electrically coupled to a same data line such as DL(m−1) (or DL(m)) and respectively electrically coupled to the two gate lines GL(n−1) and GL(n).

During the pixel structure 22 displays a gray level, the gate lines GL(n−1) and GL(n) will sequentially provide gate driving pulses G(n−1) and G(n) to enable the pixel transistors T1, T2, T3 and T4, so that the comb-shaped electrodes E1, E2, E3, E4 are allowed to receive data voltages from the data lines DL(m−1) and DL(m). FIG. 2 shows four different situations (i)~(iv) of the data voltages received by the comb-shaped electrodes E1, E2, E3 and E4 during sequentially providing the gate driving pulses G(n−1) and G(n).

(i) when the data voltage on the data line DL(m−1) is switched from a low voltage L to a high voltage H and the data voltage on the data line DL(m) also is switched from the low voltage L to the high voltage H, i.e., the data voltage received by the comb-shaped electrode E1 is the low voltage L, the data voltage received by the comb-shaped electrode E2 is the high voltage H, the data voltage received by the comb-shaped voltage E3 is the high voltage H, and the data voltage received by the comb-shaped electrode E4 is the low voltage L, the liquid crystal molecule 221a controlled by the comb-shaped electrode pair E1, E2 tends to tilt to the right side, the liquid crystal molecule 221b controlled by the comb-shaped electrode pair E3, E4 tends to tilt to the left side, and therefore the pixel structure 22 operates at a wide view mode.

(ii) when the data voltage on the data line DL(m−1) is switched from the high voltage H to the low voltage L, and the data voltage on the data line DL(m) also is switched from the high voltage H to the low voltage L, i.e., the data voltage received by the comb-shaped electrode E1 is the high voltage H, the data voltage received by the comb-shaped electrode E2 is the low voltage L, the data voltage received by the comb-shaped electrode E3 is the low voltage L, and the data voltage received by the comb-shaped electrode E4 is the high voltage H, the liquid crystal molecule 221a controlled by the comb-shaped electrode pair E1, E2 tends to tilt to the left side, the liquid crystal molecule 221b controlled by the comb-shaped electrode pair E3, E4 tends to tilt to the right side, and therefore the pixel structure 22 operates at another wide view mode.

(iii) when the data voltage on the data line DL(m−1) is switched from the high voltage H to the low voltage L, and the data voltage on the data line DL(m) is switched from the low voltage L to the high voltage H, the liquid crystal molecule 221a controlled by the comb-shaped electrode pair E1, E2 tends to tilt to the left side, the liquid crystal molecule 221b controlled by the comb-shaped electrode pair E3, E4 also tends to tilt to the left side, and therefore the pixel structure 22 operates at a narrow view mode (i.e., an anti-peek mode) and only is suitable for the user to observe from the right side.

(iv) when the data voltage on the data line DL(m−1) is switched from the low voltage L to the high voltage H, and the data voltage on the data line DL(m) is switched from the high voltage H to the low voltage L, the liquid crystal molecule 221a controlled by the comb-shaped electrode pair E1, E2 tends to tilt to the right side, the liquid crystal molecule 221b controlled by the comb-shaped electrode pair E3, E4 also tends to tile to the right side, and therefore the pixel structure 22 operates at another narrow view mode (i.e., another anti-peek mode) and only is suitable for the user to observe from the left side.

Figure 3:
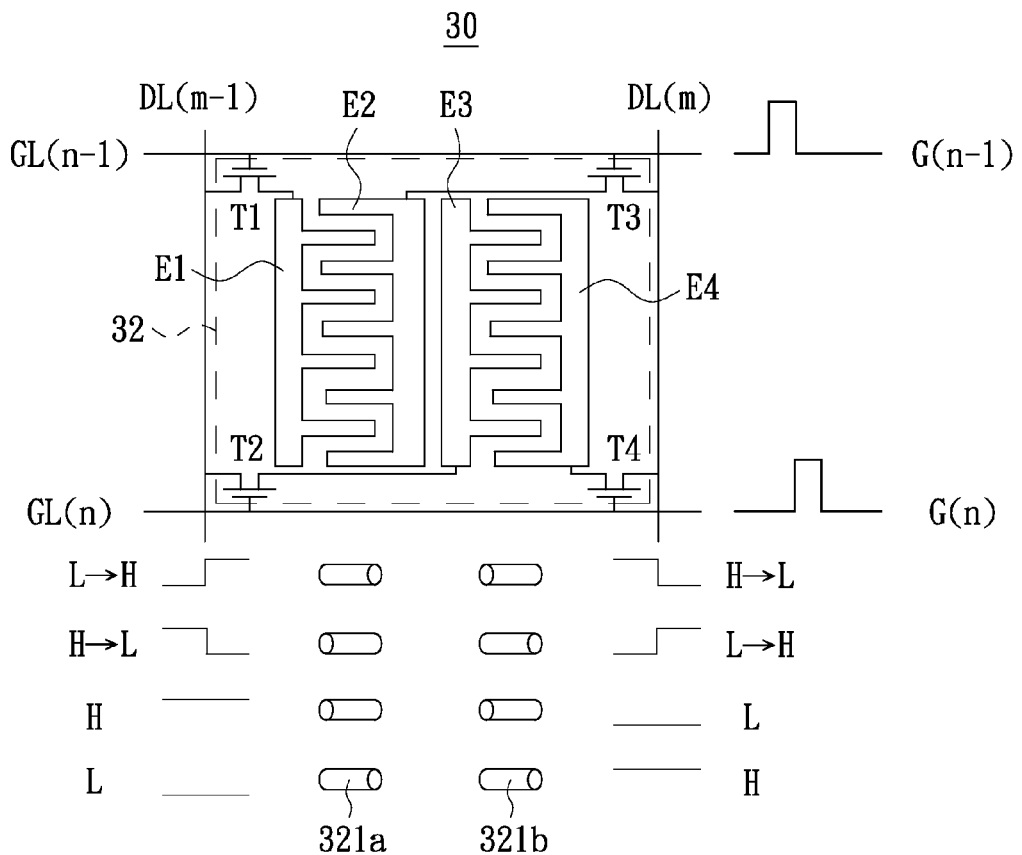
FIG. 3 is a partial schematic structural view of a vertical alignment mode liquid crystal display device in accordance with a third embodiment of the present invention.

Referring to FIG. 3, a partial schematic structural view of a vertical alignment mode liquid crystal display device in accordance with a third embodiment of the present invention is shown. In FIG. 3, only one pixel structure of the vertical alignment mode liquid crystal display device 30 is shown for the purpose of illustration, but not to limit the amount of pixel structures of the vertical alignment mode liquid crystal display device in accordance with the embodiment. As illustrated in FIG. 3, the pixel structure 32 includes comb-shaped electrodes E1, E2, E3, E4 and pixel transistors T1, T2, T3, T4. Herein, the comb-shaped electrodes E1, E2, E3, E4 cooperatively form a pixel electrode of the pixel structure 32. Of course, the pixel structure 32 generally further includes a common electrode (not shown in FIG. 3) disposed opposite to the pixel electrode and liquid crystal molecules such as 321a, 321b arranged between the pixel electrode and the common electrodes. In this embodiment, the comb-shaped electrodes E1, E2, E3 and E4 are interdigitated in a pairwise manner, and thereby the comb-shaped electrodes E1 and E2 form a comb-shaped electrode pair, and likewise the comb-shaped electrodes E3 and E4 form another comb-shaped electrode pair. The liquid crystal molecule 321a is arranged between the common electrode and the comb-shaped electrode pair E1, E2, and the liquid crystal molecule 321b is arranged between the common electrode and the comb-shaped electrode pair E3, E4.

The comb-shaped electrode E1 is electrically coupled to a data line DL(m−1) and a gate line GL(n−1) of the vertical alignment mode liquid crystal display device 30 through the pixel transistor T1, the comb-shaped electrode E2 is electrically coupled to another data line DL(m) and the gate line GL(n−1) of the vertical alignment mode liquid crystal display device 30 through the pixel transistor T3, the comb-shaped electrode E3 is electrically coupled to the data line DL(m−1) and another gate line GL(n) of the vertical alignment mode liquid crystal display device 30 through the pixel transistor T2, and the comb-shaped electrode E4 is electrically coupled to the data line DL(m) and the gate line GL(n) through the pixel transistor T4, where m and n both are integers. In short, the two comb-shaped electrodes such as E1 and E2 (or E3 and E4) in a same comb-shaped electrode pair are electrically coupled to a same data line such as DL(m−1) (or DL(m)) and respectively electrically coupled to the two gate lines GL(n−1) and GL(n).

During the pixel structure 32 displays a gray level, the gate lines GL(n−1) and GL(n) will sequentially provide gate driving pulses G(n−1) and G(n) to enable the pixel transistors T1, T2, T3 and T4, so that the comb-shaped electrodes E1, E2, E3, E4 are allowed to receive data voltages from the data lines DL(m−1) and DL(m). FIG. 3 shows four different situations (I)~(IV) of the data voltages received by the comb-shaped electrodes E1, E2, E3 and E4 during sequentially providing the gate driving pulses G(n−1) and G(n).

(I) when the data voltage on the data line DL(m−1) is switched from a low voltage L to a high voltage H and the data voltage on the data line DL(m) is switched from the high voltage H to the low voltage L, i.e., the data voltage received by the comb-shaped electrode E1 is the low voltage L, the data voltage received by the comb-shaped electrode E2 is the high voltage H, the data voltage received by the comb-shaped electrode E3 is the high voltage H, and the data voltage received by the comb-shaped electrode E4 is the low voltage L, the liquid crystal molecule 321a controlled by the comb-shaped electrode pair E1, E2 tends to tilt to the right side, the liquid crystal molecule 321b controlled by the comb-shaped electrode pair E3, E4 tends to tilt to the left side, and therefore the pixel structure 32 operates at a wide view mode.

(II) when the data voltage on the data line DL(m−1) is switched from the high voltage H to the low voltage L, and the data voltage on the data line DL(m) is switched from the low voltage L to the high voltage H, i.e., the data voltage received by the comb-shaped electrode E1 is the high voltage H, the data voltage received by the comb-shaped electrode E2 is the low voltage L, the data voltage received by the comb-shaped electrode E3 is the low voltage L, and the data voltage received by the comb-shaped electrode E4 is the high voltage H, the liquid crystal molecule 321a controlled by the comb-shaped electrode pair E1, E2 tends to tilt to the left side, the liquid crystal molecule 321b controlled by the comb-shaped electrode pair E3, E4 tends to tilt to the right side, and therefore the pixel structure 32 operates at another wide view mode.

(III) when the data voltage on the data line DL(m−1) is kept at the high voltage H, and the data voltage on the data line DL(m) is kept at the low voltage L, the liquid crystal molecule 321a controlled by the comb-shaped electrode pair E1, E2 tends to tilt to the left side, the liquid crystal molecule 321b controlled by the comb-shaped electrode pair E3, E4 also tends to tilt to the left side, and therefore the pixel structure 32 operates at a narrow view mode (i.e., an anti-peek mode) and only is suitable for the user to observe from the right side.

(IV) when the data voltage on the data line DL(m−1) is kept at the low voltage L, and the data voltage on the data line DL(m) is kept at the high voltage H, the liquid crystal molecule 321a controlled by the comb-shaped electrode pair E1, E2 tends to tilt to the right side, the liquid crystal molecule 321b controlled by the comb-shaped electrode pair E3, E4 also tends to tile to the right side, and therefore the pixel structure 32 operates at another narrow view mode (i.e., another anti-peek mode) and only is suitable for the user to observe from the left side.

In short, in the above first through third embodiments of the present invention, by suitably changing electrical connection relationships between the comb-shaped electrodes E1~E4 in the pixel electrode and the pixel transistors T1~T4, the data lines DL(m−1), DL(m), the gate lines GL(n−1), GL(n) and using suitable data voltage provision manners, makes the data voltages received by the respective comb-shaped electrodes E1~E4 be not completely identical and the data voltages received by the two comb-shaped electrodes in a same comb-shaped electrode pair be different from each other, so that the orientation of each liquid crystal molecule in each of the pixel structures 12, 22, 32 can be flexibly adjusted, for example, enabling the liquid crystal molecules to align a same orientation or multiple different orientations so that each of the pixel structures 12, 22, 32 can operate at the wide view mode or anti-peek mode, and further the panel brightness in the wide view mode would not be not decreased.

Figure 4:
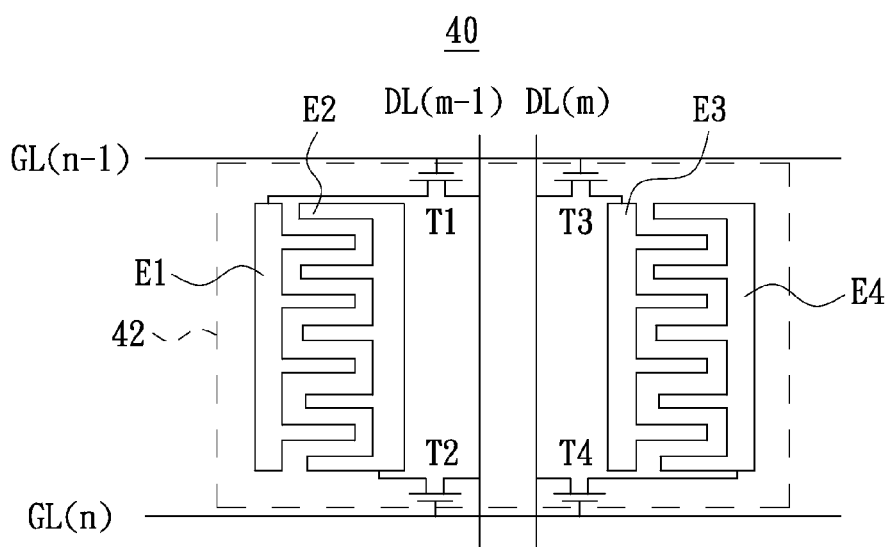
FIG. 4 is a partial schematic structural view of a vertical alignment mode liquid crystal display device in accordance with a fourth embodiment of the present invention.
Figure 5:
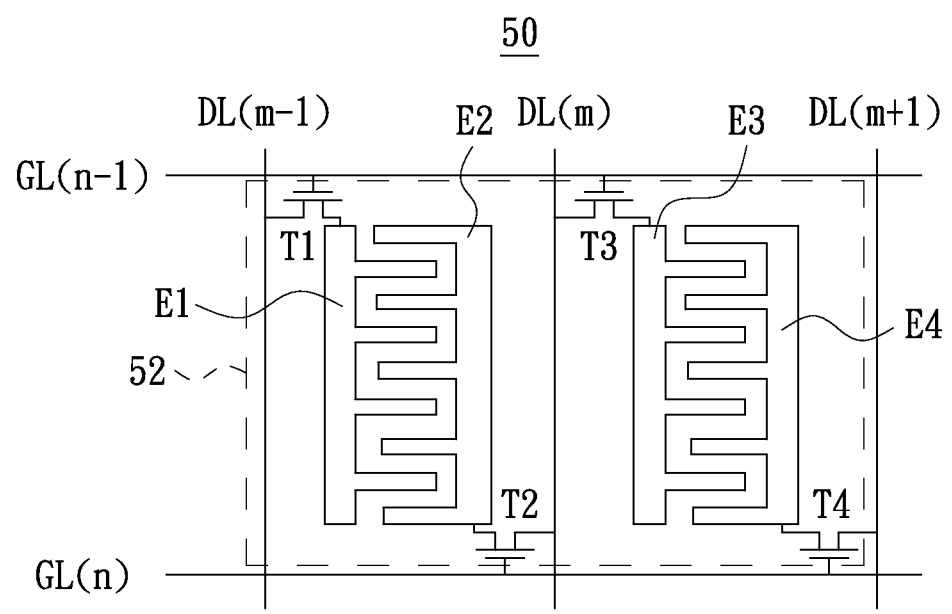
FIG. 5 is a partial schematic structural view of a vertical alignment mode liquid crystal display device in accordance with a fifth embodiment of the present invention.

In addition, the comb-shaped electrodes E~E4 in each pixel structure in accordance with the first through third embodiments are arranged between two adjacent data lines DL(m−1) and DL(m), but it is not to limit the present invention, and the relative positional relationships between the comb-shaped electrodes E1~E4 and the data lines can be like that as illustrated in FIGS. 4 and 5.

Referring to FIG. 4, a partial schematic structural view of a vertical alignment mode liquid crystal display device in accordance with a fourth embodiment is shown. In FIG. 4, only one pixel structure of the vertical alignment mode liquid crystal display device 40 is shown for the purpose of illustration, but not to limit the amount of pixel structures of the vertical alignment mode liquid crystal display device in accordance with the present invention. As illustrated in FIG. 4, the pixel structure 42 includes comb-shaped electrodes E1, E2, E3, E4 and pixel transistors T1, T2, T3, T4. Herein, the comb-shaped electrodes E1, E2, E3, E4 cooperatively form a pixel electrode of the pixel structure 42. Of course, the pixel structure 42 generally further includes a common electrode (not shown in FIG. 4) disposed opposite to the pixel electrode and liquid crystal molecules (not shown in FIG. 4) arranged between the pixel electrode and the common electrodes. In this embodiment, the comb-shaped electrodes E1, E2, E3 and E4 are interdigitated in a pairwise manner, and thereby the comb-shaped electrodes E1 and E2 form a comb-shaped electrode pair, and likewise the comb-shaped electrodes E3 and E4 form another comb-shaped electrode pair.

The comb-shaped electrode E1 is electrically coupled to a data line DL(m−1) and a gate line GL(n−1) of the vertical alignment mode liquid crystal display device 40 through the pixel transistor T1, the comb-shaped electrode E2 is electrically coupled to the data line DL(m−1) and another gate line GL(n) of the vertical alignment mode liquid crystal display device 40 through the pixel transistor T2, the comb-shaped electrode E3 is electrically coupled to another data line DL(m) and the gate line GL(n−1) of the vertical alignment mode liquid crystal display device 40 through the pixel transistor T3, and the comb-shaped electrode E4 is electrically coupled to the data line DL(m) and the gate line GL(n) through the pixel transistor T4, where m and n both are integers. In short, the two comb-shaped electrodes such as E1 and E2 (or E3 and E4) in a same comb-shaped electrode pair are electrically coupled to a same data line such as DL(m−1) (or DL(m)) and respectively electrically coupled to the two gate lines GL(n−1) and GL(n).

Furthermore, in the fourth embodiment, the data lines DL(m−1), DL(m) are arranged between the comb-shaped electrode pair E1, E2 and the comb-shaped electrode pair E3, E4.

Referring to FIG. 5, a partial schematic structural view of a vertical alignment mode liquid crystal display device in accordance with a fifth embodiment is shown. In FIG. 5, only one pixel structure of the vertical alignment mode liquid crystal display device 50 is shown for the purpose of illustration, but not to limit the amount of pixel structures of the vertical alignment mode liquid crystal display device in accordance with the present invention. As illustrated in FIG. 5, the pixel structure 52 includes comb-shaped electrodes E1, E2, E3, E4 and pixel transistors T1, T2, T3, T4. Herein, the comb-shaped electrodes E1, E2, E3, E4 cooperatively form a pixel electrode of the pixel structure 52. Of course, the pixel structure 52 generally further includes a common electrode (not shown in FIG. 5) disposed opposite to the pixel electrode and liquid crystal molecules (not shown in FIG. 5) arranged between the pixel electrode and the common electrodes. In this embodiment, the comb-shaped electrodes E1, E2, E3 and E4 are interdigitated in a pairwise manner, and thereby the comb-shaped electrodes E1 and E2 form a comb-shaped electrode pair, and likewise the comb-shaped electrodes E3 and E4 form another comb-shaped electrode pair.

The comb-shaped electrode E1 is electrically coupled to a data line DL(m−1) and a gate line GL(n−1) of the vertical alignment mode liquid crystal display device 50 through the pixel transistor T1, the comb-shaped electrode E2 is electrically coupled to another data line DL(m) and another gate line GL(n) of the vertical alignment mode liquid crystal display device 50 through the pixel transistor T2, the comb-shaped electrode E3 is electrically coupled to the data line DL(m) and the gate line GL(n−1) of the vertical alignment mode liquid crystal display device 50 through the pixel transistor T3, and the comb-shaped electrode E4 is electrically coupled to another data line DL(m+1) and the gate line GL(n) through the pixel transistor T4, where m and n both are integers. In short, the two comb-shaped electrodes such as E1 and E2 (or E3 and E4) in a same comb-shaped electrode pair are respectively electrically coupled to the data lines such as DL(m−1) and DL(m) (or DL(m) and DL(m+1)) and further respectively electrically coupled to the two gate lines GL(n−1) and GL(n).

Furthermore, in the fifth embodiment, the data lines DL(m−1), DL(m), DL(m+1) are alternately arranged with the comb-shaped electrode pairs E1, E2 and E3, E4 along a lengthwise direction (e.g., the horizontal direction in FIG. 5) of the gate lines GL(n−1), GL(n). In other words, each comb-shaped electrode pair is arranged between two adjacent data lines.

In summary, in the various embodiments, owing to the structural design of pixel electrode, cooperative with the liquid crystal molecule orientation control in the pixel structure by providing different data voltages (i.e., generally driving voltages), the pixel structure can achieve the purpose of view angle being adjustable e.g., switchable between a wide view mode and a narrow view mode and further the brightness of the display panel endowed with privacy function would not be decreased in the wide view mode.

Additionally, it is found from the first through fifth embodiments that a single pixel structure can be considered as including only one comb-shaped electrode pair instead, by modulating the data voltages provided to the two comb-shaped electrodes in the comb-shaped electrode pair, the liquid crystal molecule(s) can be enabled to tilt to the left side or the right side for switching different narrow view modes, which also can achieve the purpose of privacy.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pixel structure adapted to a vertical alignment mode liquid crystal display device and comprising:
   a plurality of comb-shaped electrodes interdigitated in a pairwise manner and thereby forming at least one comb-shaped electrode pair; and
   a plurality of pixel transistors respectively electrically coupled to the comb-shaped electrodes;
   wherein the comb-shaped electrodes are electrically coupled to receive a plurality of data voltages through the respective pixel transistors and whereby at least a part of the data voltages are different, and the data voltages received by the two comb-shaped electrodes of each comb-shaped electrode pair are different from each other, two pixel transistors electrically coupled to a same comb-shaped electrode pair are sequentially enabled respectively by gate driving signals provided by two gate lines of the vertical alignment mode liquid crystal display device.

2. The pixel structure as claimed in claim 1, wherein the two comb-shaped electrodes of each comb-shaped electrode pair receive the different data voltages from a same data line of the vertical alignment mode liquid crystal display device through two corresponding ones of the pixel transistors.

3. The pixel structure as claimed in claim 1, wherein the two comb-shaped electrodes of each comb-shaped electrode pair receive the different data voltages respectively from two data lines of the vertical alignment mode liquid crystal display device through two corresponding ones of the pixel transistors.

4. The pixel structure as claimed in claim 1, wherein the two pixel transistors electrically coupled to a same comb-shaped electrode pair are enabled by a gate driving signal provided by a same gate line of the vertical alignment mode liquid crystal display device.

5. The pixel structure as claimed in claim 1, wherein the amount of the comb-shaped electrodes is four, the four comb-shaped are interdigitated in a pairwise manner and thereby form two comb-shaped electrode pairs, and further the data voltages received by the comb-shaped electrodes are partially identical.

6. A vertical alignment mode liquid crystal display device comprising:
 a first data line;
 two gate lines arranged crossing over the first data line; and
 a pixel structure comprising:
  a plurality of pixel transistors; and
  a plurality of comb-shaped electrodes interdigitated in a pairwise manner and electrically coupled to the two gate lines through the respective pixel transistors, at least a part of the comb-shaped electrodes being electrically coupled to the first data line through a corresponding one(s) of the pixel transistors,
  wherein the comb-shaped electrodes are interdigitated in a pairwise manner and thereby form at least one comb-shaped electrode pair, the two comb-shaped electrodes of a same comb-shaped electrode pair respectively electrically coupled to the two gate lines through two corresponding ones of the pixel transistors.

7. The vertical alignment mode liquid crystal display device as claimed in claim 6, further comprising:
 a second data line, wherein at least a part of the comb-shaped electrodes uncoupled with the first data line is/are electrically coupled to the second data line through a corresponding one(s) of the pixel transistors.

8. The vertical alignment mode liquid crystal display device as claimed in claim 7, wherein the amount of the comb-shaped electrodes is four, the four comb-shaped electrodes are interdigitated in a pairwise manner and thereby form two comb-shaped electrode pairs, and the two comb-shaped electrode pairs are arranged between the first data line and the second data line.

9. The vertical alignment mode liquid crystal display device as claimed in claim 7, wherein the amount of the comb-shaped electrodes is four, the four comb-shaped electrodes are interdigitated in a pairwise manner and thereby form two comb-shaped electrode pairs, and the first and second data lines are arranged between the two comb-shaped electrode pairs.

10. The vertical alignment mode liquid crystal display device as claimed in claim 7, wherein the amount of the comb-shaped electrodes is four, the four comb-shaped electrodes are interdigitated in a pairwise manner and thereby form two comb-shaped electrode pairs, and the first and second data lines are alternately arranged with the two comb-shaped electrode pairs along a lengthwise direction of the two gate lines.

11. The vertical alignment mode liquid crystal display device as claimed in claim 6, wherein the comb-shaped electrodes are interdigitated in a pairwise manner and thereby form at least one comb-shaped electrode pair, the two comb-shaped electrodes of a same comb-shaped electrode pair electrically coupled to a same one of the two gate lines through two corresponding ones of the pixel transistors.

12. A pixel driving method of liquid crystal display device, adapted to a vertical alignment mode liquid crystal display device, wherein the vertical alignment mode liquid crystal display device comprises a pixel structure and two gate lines, the pixel structure comprises a plurality of comb-shaped electrodes and a plurality of liquid crystal molecules, the comb-shaped electrodes are electrically coupled to the two gate line and interdigitated in a pairwise manner to form a plurality of comb-shaped electrode pairs, and the two comb-shaped electrodes of each of the comb-shaped electrode pairs respectively electrically coupled to the two gate lines; the pixel driving method comprising steps of:
 sequentially enabling the two gate lines; and
 providing a plurality of data voltages to the comb-shaped electrodes to modulate an orientation of each of the liquid crystal molecules in the pixel structure, the data voltages being not completely identical;
 wherein the two data voltages received by the two comb-shaped electrodes in each of the comb-shaped electrode pairs are different from each other.

13. The pixel driving method as claimed in claim 12, further comprising a step of:
 enabling the liquid crystal molecules in the pixel structure to align along a same orientation by the comb-shaped electrodes receiving the data voltages.

14. The pixel driving method as claimed in claim 12, further comprising a step of:
 enabling the liquid crystal molecules in the pixel structure to align along multiple different orientations by the comb-shaped electrodes receiving the data voltages.

* * * * *